United States Patent
Wong et al.

(10) Patent No.: US 9,921,899 B2
(45) Date of Patent: Mar. 20, 2018

(54) MONITORING SERIAL LINK ERRORS (71) Applicant: Oracle International Corporation, Redwood City, CA (US)

(72) Inventors: Michelle Wong, Cupertino, CA (US); Dawei Huang, San Diego, CA (US); Thomas Wicki, Palo Alto, CA (US); Albert Martin, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/575,590

(22) Filed: Dec. 18, 2014

(65) Prior Publication Data

US 2016/0179595 A1    Jun. 23, 2016

(51) Int. Cl.
G06F 11/00    (2006.01)
G06F 11/07    (2006.01)
G06F 11/10    (2006.01)

(52) U.S. Cl.
CPC ........ G06F 11/076 (2013.01); G06F 11/0706 (2013.01); G06F 11/1004 (2013.01)

(58) Field of Classification Search
CPC .......................... G06F 11/076; G06F 11/1004
See application file for complete search history.

(56) References Cited

U.S. PATENT DOCUMENTS

| | | | |
|---|---|---|---|
| 6,795,515 B1 * | 9/2004 | Riedle ................... | H04L 7/0338 326/38 |
| 7,672,222 B2 | 3/2010 | Lesartre | |
| 8,687,743 B2 | 4/2014 | Ahmed | |
| 2005/0251595 A1 | 11/2005 | Lesartre | |
| 2008/0049716 A1 * | 2/2008 | Munguia ............. | G06F 13/4291 370/351 |
| 2008/0130811 A1 * | 6/2008 | Bae ......................... | G11O 5/063 375/355 |
| 2009/0024883 A1 * | 1/2009 | Bethard .................... | H04L 1/22 714/708 |
| 2009/0097391 A1 | 4/2009 | Diab | |
| 2011/0179315 A1 * | 7/2011 | Yang ........................ | H04L 1/203 714/48 |
| 2011/0209027 A1 * | 8/2011 | Schmidt ................ | H04L 1/0045 714/752 |
| 2013/0326286 A1 * | 12/2013 | Nagano .................. | H04L 1/004 714/48 |

(Continued)

Primary Examiner — Thien D Nguyen
(74) Attorney, Agent, or Firm — Meyertons, Hood, Kivlin, Kowert & Goetzel, P.C.

(57) ABSTRACT

A serial link data monitoring apparatus for targeting a given Bit Error Rate (BER) for stable serial link data communication is disclosed. An interface unit may be configured to receive data via a serial interface, and circuitry may be configured to monitor errors in the data. The circuitry may be further configured to perform one or more first training operations in response to a determination that the number of errors detected in the data is greater than a first threshold value, and perform a second training operation in response to a determination that a number of first training operations performed in a predetermined period of time is greater than a second threshold value. An amount of time to perform the second training operation may be greater than an amount of time to perform a given one of the first training operations.

20 Claims, 5 Drawing Sheets

(56) References Cited

U.S. PATENT DOCUMENTS

| | | | |
|---|---|---|---|
| 2015/0066819 A1* | 3/2015 | Mozak | G06N 99/005 |
| | | | 706/12 |
| 2015/0278138 A1* | 10/2015 | Seidel | G06F 13/405 |
| | | | 714/800 |
| 2015/0372803 A1* | 12/2015 | Jiang | H04L 7/0062 |
| | | | 375/355 |

* cited by examiner

MONITORING SERIAL LINK ERRORS

BACKGROUND OF THE INVENTION

Field of the Invention

This invention relates to high performance computing network systems, and more particularly, to serial data transfers.

Description of the Relevant Art

Computing systems typically include a number of interconnected integrated circuits. In some cases, the integrated circuits may communicate through parallel interfaces, which simultaneously communicate multiple bits of data. In other cases, the integrated circuits may employ a serial interface, which sequentially communicates one or more bits of data at a time. For both parallel and serial interfaces, communicated data may be differentially transmitted.

Parallel interfaces may utilize wide communication buses, i.e., buses that transport data words of 16 bits, 32 bits, 64 bits, or more in parallel. The physical implementation of such communication buses may consume significant area on an integrated circuit or system. Additionally, such buses may be susceptible to various parasitic effects. For example, inductive and/or capacitive coupling between individual wires of a bus may result in signal noise that may reduce a maximum frequency of transmission. Such parasitic effects may become more pronounced with increased operational frequencies and reduced geometric dimensions of the wide buses and associated interconnect. Moreover, impedance mismatch at the end of individual wires of a bus may result in reflection or ringing, further contributing to noise and increased propagation delays to the signals being transmitted.

To remediate problems associated with high-speed parallel data transmission, parallel data may be serialized at the transmission side before transmission, and then deserialized, on the receiver side, upon reception. A pair of Serializer and Deserializer (SERDES) circuits may be employed for this purpose.

SUMMARY OF THE EMBODIMENTS

Various embodiments of a serial data system are disclosed. Broadly speaking, an apparatus and a method are contemplated in which a de-serialization unit may be configured to receive data via a serial interface. Circuitry may be configured to determine a number of errors in the data, and perform one or more first training operations on the serial interface responsive to a determination that the number of errors in the data is greater than or equal to a first threshold value. The circuitry may be further configured to perform a second training operation on the serial interface in response to a determination that a number of first training operations performed during a predetermined period of time is greater than or equal to a second threshold value. A time to perform the second training operation may be greater than a time to perform a given one of the one or more first training operation.

In one embodiment, the circuitry may be further configured to perform a Cyclic Redundancy Check (CRC) in order to determine the number of errors in the data. In a further embodiment, the circuitry may be further configured to increment a first counter in response to detecting an error in the data in a given time period of a plurality of time periods.

In another non-limiting embodiment, the circuitry may be further configured to reset the first counter in response to a determination that a given time period has expired. The circuitry may be further configured to reset the first counter responsive to a determination that the first training operation has completed.

These and other embodiments will become apparent upon reference to the following description and accompanying drawings.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) interpretation for that unit/circuit/component. More generally, the recitation of any element is expressly intended not to invoke 35 U.S.C. §112, paragraph (f) interpretation for that element unless the language "means for" or "step for" is specifically recited.

DETAILED DESCRIPTION OF EMBODIMENTS

In some computing systems, data may be transmitted in a serial fashion from one functional unit to another functional unit. By employing serial data transfers, a computing system may reduce area and power consumption associated with wide parallel data transfer techniques. When employing serial data transfers, each functional unit may employ Serializer and Deserializer (SERDES) circuits, which may be configured to convert parallel data in a functional unit to serial data for transmission, and convert, received serial data back to parallel data, respectively. SERDES circuits may be used in various applications. For example, fiber optic communication systems, gigabit Ethernet systems, and cache coherence links in chip multi-threading (CMT) systems with multiple nodes may employ SERDES circuits.

To maintain accurate data transfers, communication interfaces (also referred to herein as "communication links") that use SERDES circuits may employ periodic tuning (or "training"), during which known data patterns may be transmitted and sampling circuitry adjusted to minimize errors in received data. The frequency with which training is applied may affect the quality of a communication link. For example, if training is too frequent, the data transfer bandwidth may be reduced. Alternatively, if training is too infrequent, the quality of data transfer may be degraded. The embodiments illustrated in the drawings and described below may provide techniques for initiating training when link quality is approaching a threshold level.

Figure 1:
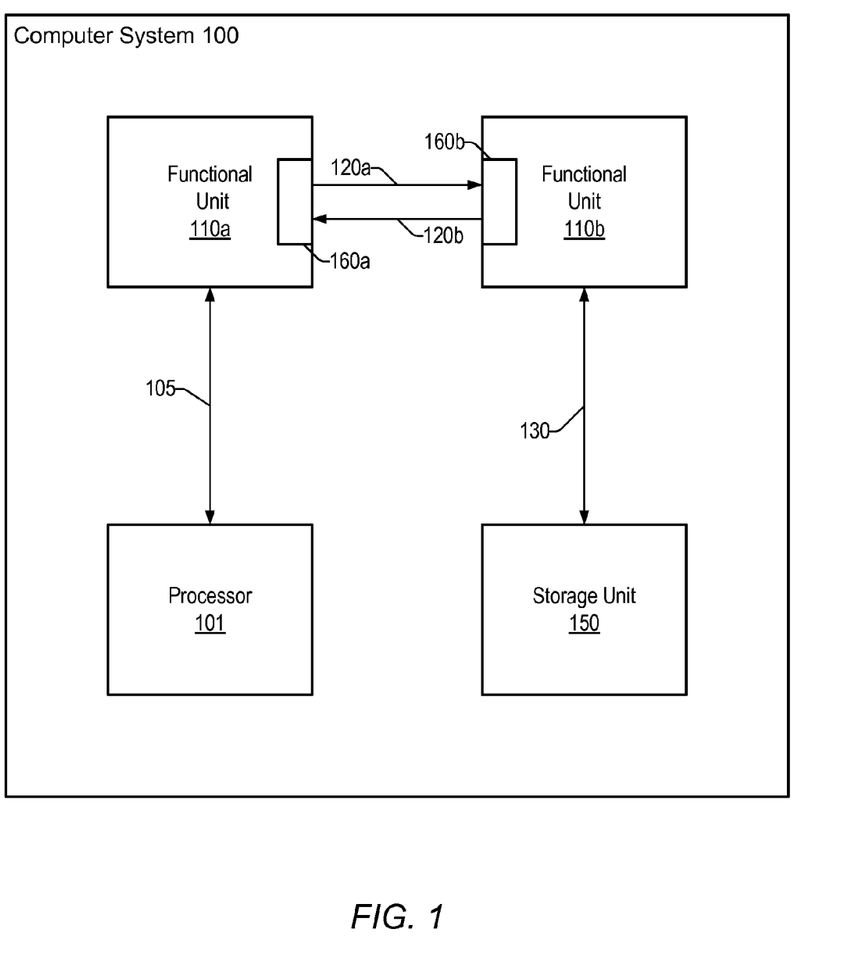
FIG. 1 is a generalized block diagram illustrating an embodiment of a computer system.

Referring to FIG. 1, a generalized block diagram illustrating one embodiment of a computing system 100 is shown. Computing system 100 may include processor 101, coupled to functional unit 110a through interface 105. Functional unit 110a may be coupled to functional unit 110b through communication channels 120a and 120b. Functional unit 110b may be coupled to storage unit 150 through interface 130.

Processor 101 may request data from storage unit 150. In some embodiments, processor 101 may be a motherboard including one or more processor cores. In some embodiments, the processor cores may implement any suitable instruction set architecture (ISA), such as, e.g., SPARC, PowerPC™, or x86 ISAs, or a combination thereof. Processor 101 may include one or more bus interfaces, such as, e.g., interface 105, which may allow processor 101 to communicate to other functional blocks within computing system 100 such as, functional unit 110a for example. Interface 105 may be a parallel bus interface of any suitable width, such as, for example 16, 32, or 64 bits wide. It is noted that the arrangement of functional units within computing system 100 depicted in FIG. 1 is merely an example. In other embodiments, other arrangements are possible. For example, in some embodiments, functional unit 110a may be included within processor 101, and interface 105 may be an internal bus within a chip including processor 101.

Processor 101 may issue a command to functional unit 110a through interface 105 to initiate a connection to storage unit 150 through functional unit 110b. Storage unit 150 may include main or system memory, I/O-attached storage devices, such as disk drives, or any other suitable storage device or medium. Functional unit 110a and functional unit 110b may include interface units 160a and 160b, respectively, each of which may be configured to transmit data to and receive data from serial channels 120a and 120b. In some embodiments, serial channels 120a and 120b may include only differential data pairs with no dedicated clock signal, while, in other embodiments, a clock signal may be include with the data signals. Since functional unit 110a and functional unit 110b may not be physically located on a same circuit board, the two functional units may not share a single clock source. In such cases, the transmitting block may encode a clock signal within the data stream.

Serial channels (also referred to herein as "lanes") 120a and 120b may conform to one or more high speed serial standards and include a copper wire or optical fiber cable with multiple conductive paths coupled between functional units 110a and 110b. Serial channel 120a may be a unidirectional path from functional unit 110a to functional unit 110b and conversely serial channel 120b may be a unidirectional path from functional unit 110b to functional unit 110a. In other embodiments, other standards may be employed, and serial channels 120a and 120b may be bidirectional. In some embodiments, parallel data may be serialized prior to transmission across a respective channel/lane.

Functional unit 110a may receive the command from processor 101 to initiate a connection to functional unit 110b. To initiate a connection, a process referred to as channel training, or link training, may be utilized to configure serial channels 120a-b. Functional unit 110a may send a stream of bits to functional unit 110b. Functional unit 110b may sample the stream of bits until data timing requirements can be derived. Once timing requirements are derived, functional unit 110b may calculate one or more characteristics that will be sent to functional unit 110a to be used to adjust how functional unit 110a transmits data to functional unit 110b. As described below in more detail, this process may be used to overcome various factors that negatively impact the clarity of data transmitted from functional unit 110a to functional unit 110b, such as EMI generated from the system or occurring within the environment, temperature variations, as well as effects that may be created when a high-speed signal travels along a copper wire, such as signal reflection, and the like.

While training is being performed on serial channel 120a, a similar process may be performed to initiate and configure serial channel 120b, with functional unit 110b sending the stream of data bits and functional unit 110a receiving the data, deriving data timing requirements. Once both serial channels 120 are configured, processor 101 may send a command through functional units 110a and 110b to storage unit 150, for example, to read data stored in storage unit 150. Functional unit 110b may receive the command from processor 101 via functional unit 110a, and transport the command to storage unit 150 through interface 130. It is noted that although, in the above embodiment, training is concurrently performed on serial channels 120a-b, in other embodiments, training may be performed on each channel in a serial fashion.

Interface 130 may be a parallel interface of any suitable width necessary to read data from storage unit 150 at a high enough rate to sustain the effective data rate of the serial channels 120a and 120b. Interface 130 may be, for example, 32, 64, 128, or more bits wide to read storage unit 150 at a desired data rate.

Storage unit 150 may receive the command from functional unit 110b and respond with the data from the requested address. In some embodiments, status data or handshaking protocols may be sent before the requested data. Storage unit 150 may, in some embodiments, correspond to system memory within computing system 100. Alternatively, or additionally, storage unit 150 may also be any suitable hard disk drive from any manufacturer, such as, for example, Seagate or Western Digital. Although a hard disk drive is used as an example, any storage medium may be contemplated, such as, e.g., solid-state drives, optical drives, or main memory, such as, dynamic or static RAMs, for example.

It is noted the embodiment of FIG. 1 is merely an example. In other embodiments, different numbers of communication links and different configurations of communication links may be employed.

Figure 2:
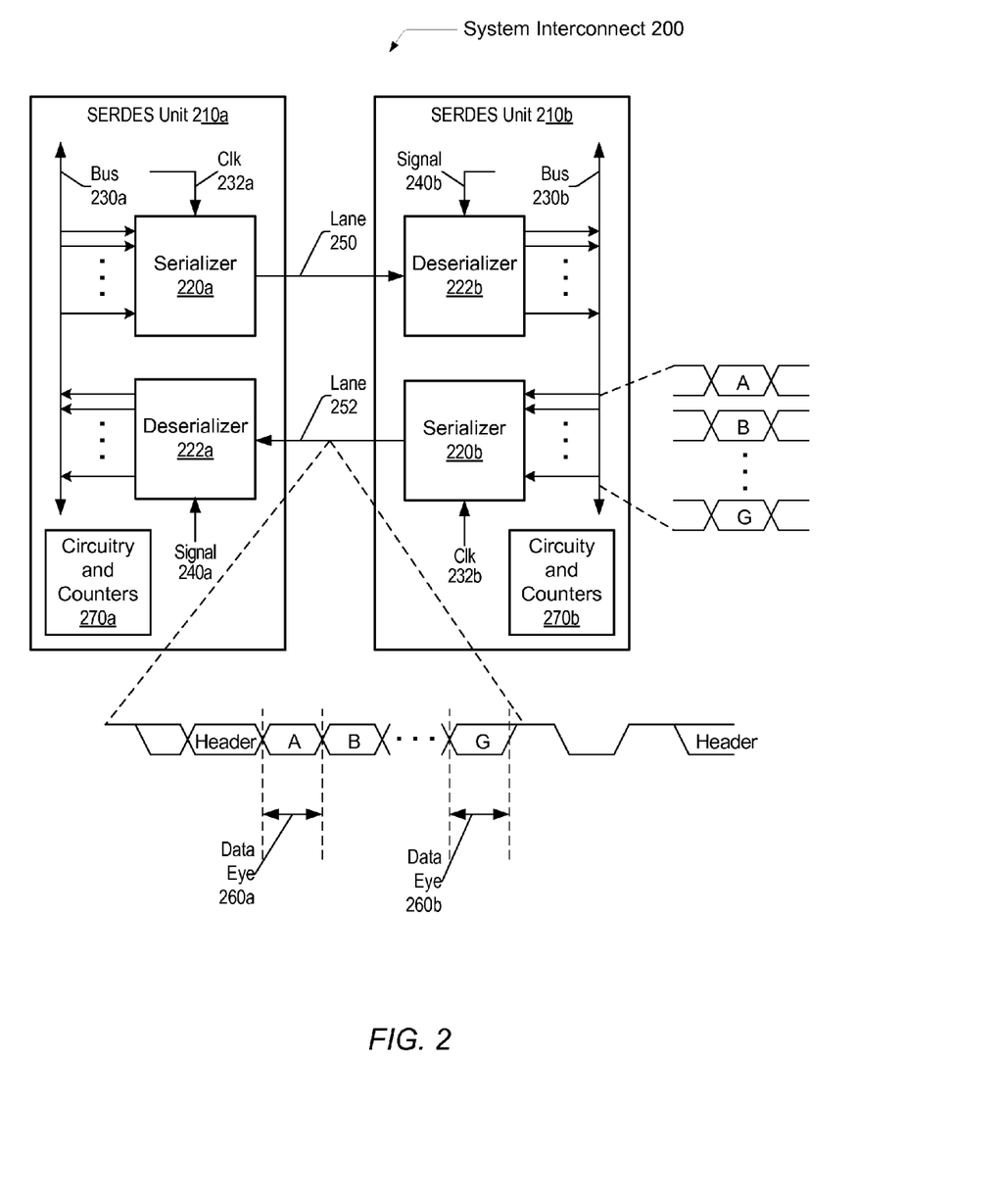
FIG. 2 is a generalized block diagram illustrating an embodiment of a system interconnect.

Referring to FIG. 2, a generalized block diagram depicting an embodiment of system interconnect is illustrated. In the illustrated embodiment, system interconnect 200 includes SERDES units 210a-210b. It is noted that although two units are depicted in FIG. 2, other embodiments may include suitable number of units. In various embodiments, SERDES units 210a and 210b may correspond to interface units 160a and 160b of FIG. 1, respectively. SERDES units 210a and 210b are coupled via lanes 250 and 252. In some embodiments, lanes 250 and 252 may employ differential signaling, while, in other embodiments, data may be transmitted on lanes 250 and 252 in a single-ended fashion.

Parallel information within a given one of the SERDES units 210a-210b may include control, status, address, parity, and data values. The parallel information may be placed on a respective one of the buses 230a-230b. The parallel information may be serialized before transmission on a given one of the lanes 250 and 252. For example, parallel data from bus 230a may be serialized by serializer 220a before transmission on lane 250. The serialized information may be de-serialized by a deserializer block, such as, e.g., deserializer 222b, upon reception.

SERDES units transform wide bit-width, single-ended signal buses and compress them to a few, typically one, differential signal that switches at a much higher frequency rate than the wide single-ended data bus. SERDES units may allow a large amount of data to be moved point-to-point. One of multiple SERDES architectures may be selected to perform the high-speed serialized data transmission. For example, the parallel clock SERDES architecture, the embedded clock bits SERDES architecture, the 8-bit/10-bit (8 b/10 b) or comma encoded SERDES architecture, and the bit interleaving SERDES architecture are some examples of SERDES architectures to use for data transmission.

In the embodiment shown, the SERDES units 210a-210b utilize an architecture with embedded clock information. Another architecture may, however, employ a dedicated clock signal. SERDES unit 210b is the transmitter for lane 252. The serializer 220b serializes the parallel information on the bus 230b. The parallel information is generally shown as data A, B, through G. Serializer 220b additionally receives the clock signal 232b. The serializer 220b combines the data A through G, and the clock signal 232b into a set of serial data bits to be transmitted on lane 252.

In various embodiments, the serialized data word with the data A through G may include a leading header to indicate valid data is being transmitted. In some embodiments, the serialized word may not contain an explicit clock signal. In such cases, serializer 220b may periodically send predetermined data to deserializer 222a that may be used for tuning both the data and clock recovery circuits. Such data may be preceded by a a different leading header indicating that training data follows. In some embodiments, different types and amounts of training data may be employed. For example, a short burst of training data may be used for minor adjustments in data and clock recovery circuits, while, a larger stream of data, requiring a longer transmission time, may be used for a more complete re-tuning of the circuits coupled to a given lane. Once a training process has completed, a leading header indicating valid data may then be transmitted by serializer 220b prior to resumption of data transmission. In other embodiments, the duration of a training process may be based on a count or timer. In such cases, valid data may be sent after the count or timer has expired, thereby avoiding the use of the leading header.

Deserializer 222a may utilize one of various algorithms for recovering the explicit data and implicit clock information in the serialized data words being received. Deserializer 222a may attempt to sample the serialized words in a manner to determine the width of the data eyes in the serialized word. A data eye is a name for a range of sample times and sample voltage thresholds inside of which a stream of data bits may be correctly read. This may also be referred to as a data valid time. The data eyes 260a-260b are two representative data eyes in the serialized word. Deserializer 222a may detect deviations from the expected width of a given data eye and an expected amplitude of received data signals. Such deviations may be used to adjust data and clock recovery circuits and to determine clock jitter, clock phase differences, clock frequency drifts, and so forth. The clock data recovery (CDR) circuits in deserializer 222a (not shown) may make adjustments on internal clock phases based on received data serialized words and place the sampling signal 240a transition edge in the middle of received data eyes to maximize the timing margin. Deserializer 222b may perform similar steps.

The SERDES units may attempt to place the transitioning edges of the receiving clock signals in the middle of the data eyes, such as data eyes 260a and 260b, for maximum timing margin. Due to channel loss, reflection and crosstalk, the received data serialized words at the deserializers 222a and 222b may be significantly distorted. The receiver circuits may recondition and equalize the received signals to maintain a desired bit error rate (BER), i.e., the number of bits received with the wrong value versus the number of total bits received for a predetermined period of time. The equalization settings may be adapted and may be based on the channel properties. Once locked, deserializer 222a may recover the serialized data values in the serial stream.

An appreciable amount of time may be consumed to initialize and configure the SERDES units before high-speed data communication begins. To initialize a connection, a process referred to as channel training may be utilized to configure serializers 220a and 220b, as well as deserializers 222a and 222b. As used and described herein, a training process includes adjusting the sampling of received test data to reduce an error rate to a desired level. For example, to initialize lane 252, serializer 220b may send a stream of bits to deserializer 222a. The series of bits may be known to both unit 210a and unit 210b in advance. In some embodiments, the stream of bits may be a consistent string of bits and may be repeated as necessary until the training is complete. In other embodiments, the stream of bits may be the output of a deterministic function, such as a pseudo-random bit sequence, which may be sent continuously until training is complete. Deserializer 222a may sample the stream of bits until the beginning and end of the data eye can be derived. Different training operations may include different amounts of data and employ different amounts of time to adjust the sampling by a receiving circuit.

During the configuration time, internal phase locking circuits, such as, e.g., phase-locked-loops (PLLs), and clock data recovery (CDR) circuits are stabilized and reach a locked state. Duty cycle corrector (DCC) circuits and phase generators are adjusted. Phase interpolators (circuits for adjusting the timing of the clock edges) may be adjusted by CDR circuits to place the transitioning edges of sampling circuits in the middle of the data eyes. Equalization circuits start to recondition the signals to maximize the eye margin and to reduce the BER.

A portion of the parameters determined during the initialization and configuration may be relatively time invariant values. This time invariant set of parameters may be used to determine a time variant set of parameters and vice-versa.

The determination process may be a recursive process. In some embodiments, after the time invariant set of parameters is determined, this set may be stored in persistent storage. The persistent storage maintains the stored data through a power down mode, such as a mode with a respective clock signal disabled. In other embodiments, the time invariant set of parameters is stored in persistent storage in response to receiving a power down indication. Each of the time invariant and the time variant set of parameters may, in various embodiments, be stored in persistent storage.

The time invariant set of parameters may be determined to be associated with the channel properties of the lanes 250 and 252. The time invariant set of parameters may, therefore, take a longer period of time to settle than the time variant set of parameters. The time variant set of parameters associated with clock data recovery may be faster to adapt and settle. For example, millions of cycles may be consumed for determining the time invariant set of parameters, whereas a few thousand cycles may be consumed for determining the time variant set of parameters. After turning off the lanes 250 and 252, a subsequent power up or awakening operation may occur. During the awakening operation, the stored time invariant set of parameters may be used as initial values for the configuration steps, thereby significantly reducing the time consumed for adapting and settling final values. In contrast, the time variant set of parameters may be reinitialized for the configuration steps. Since initial values are used for the time invariant set of parameters, the delay to begin using the lanes 250 and 252 for data transport may be greatly reduced. In some embodiments, the time variant set of parameters may be stored in persistent storage and used as initial values during a power up operation. However multiple factors may have changed, such as chip temperature, which cause the initial values to lose benefit.

Circuitry and counters 270a and 270b may be configured to generate data for training operations. In some embodiments, different data patterns and different amounts of data may be generated dependent upon a particular level of training desired. Counter circuits included within circuitry and counters 270a and 270b may track a number of time a given type of training operation is performed. Additional counters may track various time periods during which errors in the data stream or the number of training operations performed are tracked. Such time periods may be tracked as an absolute period of time, e.g., 10 milliseconds, or as a number of clock cycles or other suitable periodic signal.

Circuitry and counters 270a and 270b may be designed in accordance with one of various design styles. For example, in some embodiments, circuitry and counters 270a and 270b may include dedicated state machines configured to generate a data stream for one or more training operations, as well as determine bit error rates for received data streams. In other embodiments, circuitry and counters 270a and 270b may include a general-purpose or specialized processor configured to execute program instructions that, when executed, perform similar functions to the aforementioned dedicated state machines.

Circuitry and counters 270a and 270b may include, in various embodiments, multiple counters or other suitable sequential logic circuits, each of which may be designed in accordance with one of various design styles. Such counters may either be synchronous or asynchronous, and may include a reset function which sets a value of a given counter to a predetermine value. In other embodiments, the counters may be configured to count up from a reset value, or count down from a preloaded value.

It is noted that the embodiment illustrated in FIG. 2 is merely an example. In other embodiments, different configurations and combinations of serializers and deserializers are possible and contemplated.

Figure 3:
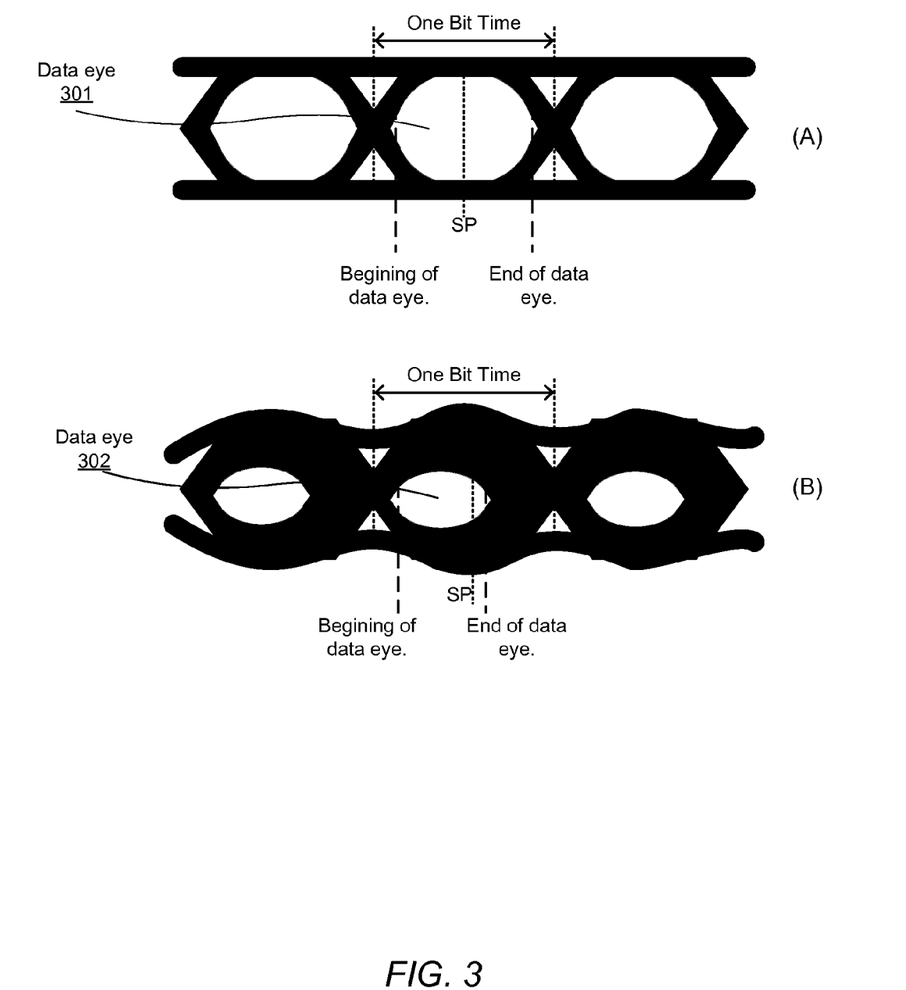
FIG. 3 is a representation of a timing diagram illustrating two embodiments of a data eye from serialized data transmissions.

Turning now to FIG. 3, a representation of a timing diagram of two embodiments of a data eye from serialized data transmissions is illustrated. These timing diagrams represent the voltage of the differential data lines over time for many data bits as may be received by a deserializer, such as, e.g., deserializer 222a as illustrated in FIG. 2. The thickness of the black lines illustrates the range of the voltage of the differential data lines due to various factors that may couple noise into the lines or create jitter from bit to bit over time. In timing diagram 3-A, a data stream is illustrated with a large well-defined data eye 301, i.e., the white space in the middle. Generally speaking, the larger and more well-defined a data eye is, the lower the BER and more reliable the communications may be.

In this example, the space from the beginning of data eye 301 to the end of data eye 301 is large compared to the overall bit time. A large window is available for deserializer 222a to set sampling signal 240a as described above. Sampling signal 240a may be set to align with a sampling point (SP) midway between the beginning and end of the data eye.

Conversely, in timing diagram 3-B, a data stream is illustrated with a smaller, less well-defined data eye 302. As mentioned, various factors that can couple noise into the lines and/or create jitter from bit to bit over time may create much more variance in the voltage output of the differential data lines, which may result in data eye 302 being shorter and narrower. This smaller data eye 302 may make defining the beginning and end of the eye much more difficult for deserializer 222a. If timing diagrams 3-A and 3-B represent the same input to deserializer 222a at different points in time, it may be seen that a sampling point (SP) set to be in the middle of data eye 301 would be near the end of data eye 302, possibly resulting in a large BER.

It is noted FIG. 3 is merely an example of data eye timing diagrams. In various embodiments, data eyes may be observed in a variety of shapes and sizes based upon the characteristics of an individual SERDES link. For example, speed of the bit data rate, format of the data, clock jitter, EMI, impedance of the connection, and length of the connect are just a few factors that may determine the actual shape of a data eye in any SERDES link.

Figure 4:
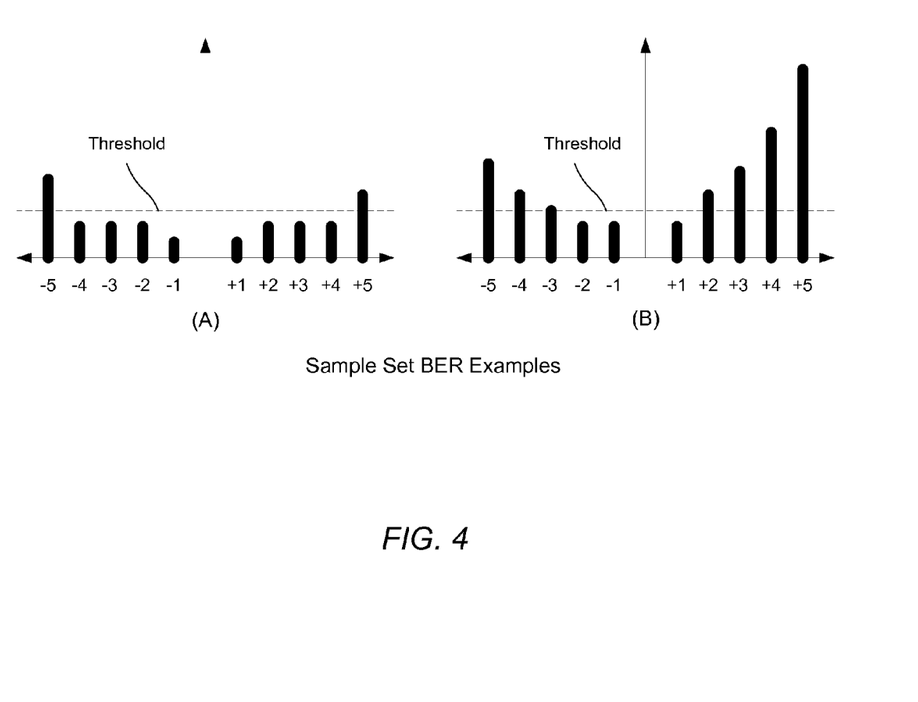
FIG. 4 is an illustration of two graphs of Bit Error Rate (BER) samples in an embodiment of system interconnect.

Turning now to FIG. 4, two example graphs are illustrated to demonstrate how BER values at various sampling points may appear. Graph A and Graph B in FIG. 4 may represent BER distributions for two different data eyes, such as, for example, data eye 301 and data eye 302 in FIG. 3. In some embodiments, the graphs may represent calculated BER values from a link training step in which deserializer 222a collected samples up to 5 steps before an initial sampling point and up to 5 steps after the initial sampling point. Each step may be a uniform offset from the initial sampling, or in other embodiments, the steps may vary. Multiple data bits may be sampled at each step in order to collect enough data to calculate a BER. The negative numbers may represent the sets of samples taken before the initial sampling point and the positive numbers may represent the sets of samples taken after. The dashed line may represent a threshold value the BER values are to be judged against.

In some embodiments, Graph A may correspond to samples taken on data eye 301. From Graph A, it can be seen that both the positive and negative BER values from samples taken 4 or fewer steps from the initial sampling point may all be below the given threshold. However, both BER values from the samples taken 5 steps from the initial sampling point may be above the threshold. In this example, the BER from the samples taken 5 steps before the initial sampling point may be slightly higher than the BER from the samples taken 5 steps after the initial sampling point. In some embodiments, deserializer 222a may set the sampling point after the initial sampling point since the +5 BER is lower than the −5 BER. In other embodiments, since both the +5 and −5 BERs exceeded the threshold and the +4 and −4 BERs did not, deserializer 222a may leave the sampling point at the initial sampling point.

Graph B may, in some embodiments, correspond to samples taken on data eye 302. In Graph B, it can be seen that both the +1 and −1 BERs do not exceed the threshold. However, the +2 BER exceeds the threshold while the −2 BER does not. Since the closest BER that exceeds the threshold is the +2 BER, deserializer 222a may set the sampling point before the initial sampling point. In some embodiments, to determine how much to move the sampling point away from the initial sampling point, deserializer 222a may evaluate some or all BER values to determine an appropriate adjustment for the sampling point. As described below in more detail with regard to FIG. 5, by performing a second training operation, BERs such as those depicted in Graph B may be reduced in various embodiments.

The examples of FIG. 4 are merely for the purposes of illustration. In various other embodiments, it is contemplated that other sampling methods may be used in place of or in conjunction with the illustrated sampling method. Measured results may differ from the results depicted in the aforementioned graphs for various reasons, such as, e.g., inaccuracies in test equipment, and the like.

Figure 5:
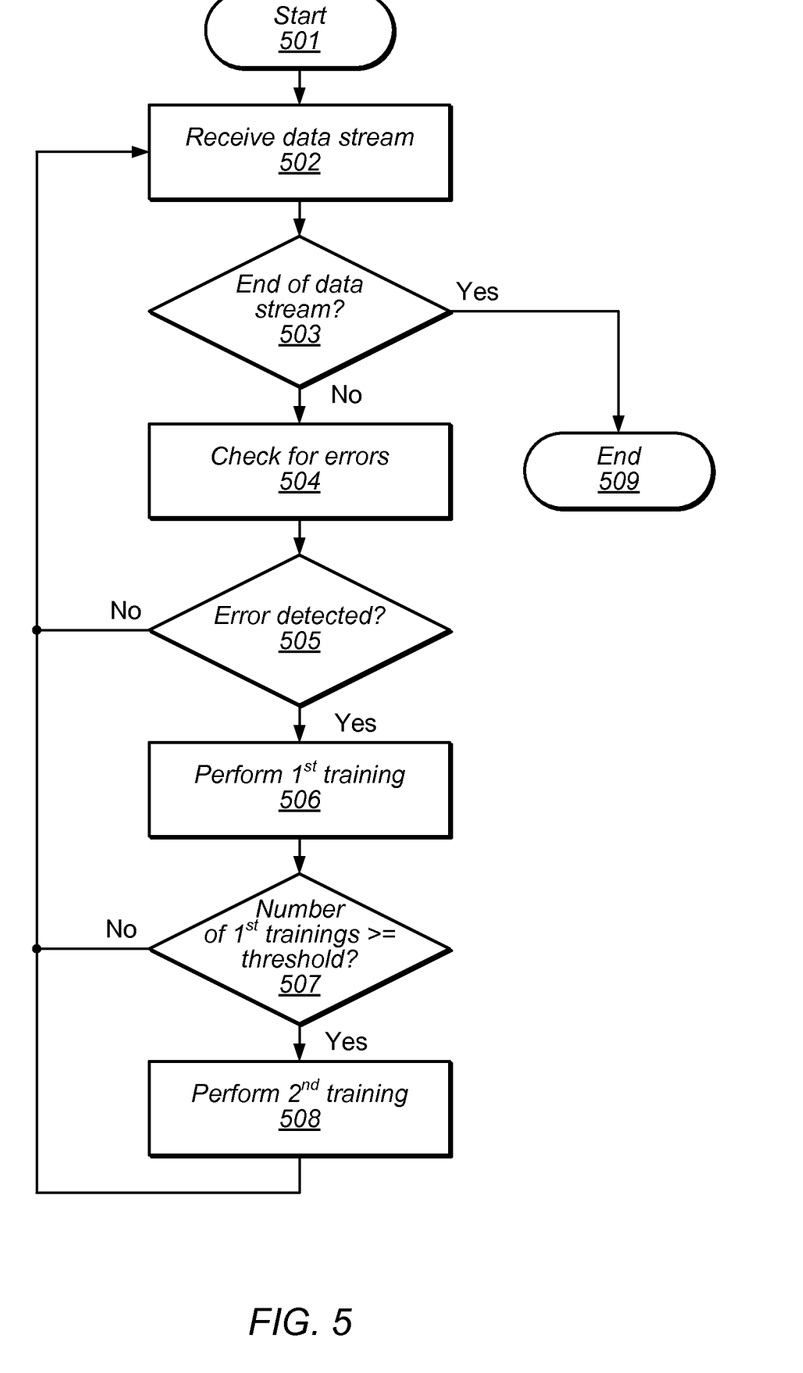
FIG. 5 illustrates a flow diagram depicting an embodiment a method operating a serial data link.

Turning now to FIG. 5, a flow diagram depicting an embodiment of a method for operating a serial interface is illustrated. Referring collectively to the embodiment illustrated in FIG. 2, and the flow diagram of FIG. 5, the method begins in block 501. Data may then be received via lane 250 (block 502). The data may be transmitted in a serial fashion, and may, in various embodiments, include a header or other designator indicating the beginning of a data stream. The method may then depend on if an end of the data stream has been detected (block 503). It is noted, that although the method is described in relation to data transmitted via lane 250, in other embodiments, similar operations may be performed for data transmitted on any suitable interface.

When the end of the data stream has been detected, the method may conclude in block 509. When the end of the data stream has yet to be detected, a check is made for any errors in transmission of the data (block 504). In various embodiments, deserializer 222b and circuitry and counters 270b may perform a Cyclic Redundancy Check (CRC) on the received data stream to determine a number of errors. Other error detection methods, such as, e.g., transmission of a status bit, checksum, or other suitable error detection method may be employed instead of, or in addition to a CRC check. Each error encountered may increment a counter within circuitry and counters 270b. In some embodiments, another counter in circuitry and counters 270b may track a predetermined period of time in order to determine an error rate. The predetermined period of time may, in other embodiments, be programmable. The method may then depend on if an error has been detected (block 505).

If no errors have been detected, the method may then proceed from block 502 as described above. If, however, at least one error has been detected, then a first training operation is performed (block 506). In some embodiments, the first training operation may be performed in response to a determined error rate being greater than a predetermined threshold value. The first training operation may, in other embodiments, be triggered in response to a number of errors detected exceeding a different predetermined threshold value. As described above, the first training operation may include serializer 220a sending a predetermined data stream to deserializer 222b via lane 250. The predetermined data stream may include a header that indicates the data is part of a training operation. In some embodiments, deserializer 222b, in conjunction with circuitry and counters 270b, may adjust a sampling point, i.e., the point in time where a data eye of the received data stream's individual data bits is sampled, in order to reduce a number of sampling errors. The first training operation may, in various embodiments, include a limited number of bits in the training data stream in order to reduce an amount of time required to perform the training operation. This type of training operation may be commonly referred to as "fast training." It is noted that, in some embodiments, the first training operation may be triggered in response to a number of errors and/or an error rate, exceeding respective threshold values.

In some embodiments, circuitry and counters 270b may reset a counter tracking a number of errors in the data stream in response to initiating the first training operation. The counter may also be reset after each predetermined period of time whether the first training operation has been performed or not. Circuitry and counters 270b may include a counter, which is incremented in response to each first training operation performed. The method may then depend on a number of first training operations performed (block 507).

If the number of first training operations performed is less than a second threshold value, then the method may proceed from block 502 as described above. If the number of first training operations performed is greater than or equal to the second threshold value, then a second training operation may be performed (block 508). In some embodiments, the number of first training operations performed is tracked over a predetermined period of time. The predetermined period of time may be programmable, and, in various embodiments, circuitry and counters 270b may include a counter configured to track the predetermined period of time. In some embodiments, the predetermined period of time may be the same period of time during which data stream errors are tracked, while, in other embodiments, the two time periods may be different. Once a second training operation has been initiated, the counter tracking the number of first training operations may be reset. Additionally, the counter tracking the number of first training operations may be reset at the end of the predetermined time period, along with any counters used to track the predetermined time period itself.

The second training operation may operate in a similar fashion to the first training operation, although an amount of time provided for the second training operation may be greater than an amount of time provided for the first training operation. In some embodiments, the second training operation may use the additional time to include a larger amount of data than the first training operations thereby allowing for more adjustments in sampling parameters. Alternatively or additionally, the second training operation may allow for the adjustment of additional or different parameters within the serializer and deserializer units as compared to the first training operation. Once the second training program has completed, the method may continue from block 502 as described above. Although two training operations are depicted in the method illustrated in FIG. 5, in various embodiments, any suitable number of training operations, each with a different amount of training data or processing time, may be employed.

It is noted that the method illustrated in the flow diagram of FIG. 5 is merely an example. In other embodiments, different operations, and different orders of operations are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An, apparatus, comprising:
a serializer circuit configured to transmit, via a communication channel, a data stream including multiple data words, wherein a particular data word includes a plurality of data bits and a header;
a deserializer circuit configured to:
receive the data stream via the communication channel;
determine a number of errors during reception of a given data word of the multiple data words;
in response to a detection of an end of the given data word:
initiate a first training operation to adjust a sampling point, in response to a determination that the number of errors is greater than a threshold number of errors; and
initiate a second training operation to adjust the sampling point, in response to a determination that a number of first training operations previously performed during a particular period of time is greater than a threshold number of previously performed first training operations; and
wherein the serializer circuit is further configured to transmit a first number of training data bits during the first training operation and transmit a second number of training data bits during the second training operation, wherein the second number of training data bits is greater than the first number of training data bits.

2. The apparatus of claim 1, wherein to determine the number of errors during the reception of the plurality of data bits, the deserializer circuit is further configured to perform a Cyclic Redundancy Check (CRC).

3. The apparatus of claim 1, wherein to determine the number of errors during the reception of the plurality of data bits, the deserializer circuit is further configured to increment a first counter in response to detecting an error in the reception of the plurality of data bits in a given time period.

4. The apparatus of claim 3, wherein the deserializer circuit is further configured to reset the first counter in response to a determination that the given time period has expired, and reset the first counter in response to a determination that the first training operation has completed.

5. The apparatus of claim 3, wherein the deserializer circuit is further configured to determine the number of first training operations performed during the particular period of time, and increment a second counter in response to a determination that the first training operation has completed.

6. The apparatus of claim 5, wherein the deserializer circuit is further configured to reset the second counter in response to a determination that the particular period of time has expired, and reset the second counter in response to a determination that the second training operation has completed.

7. A method, comprising:
transmitting, by a serializer circuit, a data stream including multiple data words via a communication channel, wherein a particular data word includes a plurality of data bits and a header;
receiving, by a deserializer circuit, the data stream via a communication channel;
determining, by the deserializer circuit, a number of errors during reception of a given data word of the multiple data words;
in response to detecting, by the deserializer circuit, an end of the given data word:
initiating a first training operation to adjust a sampling point, in response to determining that the number of errors is greater than a threshold number of errors; and
initiating a second training operation to adjust the sampling point, in response to determining that a number of first training operations previously performed during a particular period of time is greater than a threshold number of previously performed first training operations,
in response to initiating the first training operation, transmitting, by the serializer circuit, a first number of training data bits; and
in response to initiating the first training operation, transmitting, by the deserializer circuit, a second number of training data bits, wherein the second number of training data bits is greater than the first number of training data bits.

8. The method of claim 7, wherein determining the number of errors during the reception of the plurality of data bits comprises performing a Cyclic Redundancy Check (CRC).

9. The method of claim 7, wherein determining the number of errors during the reception of the plurality of data bits comprises incrementing a first counter in response to detecting an error in the given data word in a given time period.

10. The method of claim 9, further comprising resetting the first counter in response to determining the given time period has expired, and wherein performing the first training operation comprises resetting the first counter.

11. The method of claim 9, wherein determining that the number of first training operations performed during the particular period of time comprises incrementing a second counter in response to determining the first training operation has completed.

12. The method of claim 11, further comprising resetting the second counter in response to determining particular period of time has expired, and wherein performing the second training operation comprises resetting the second counter.

13. The method of claim 7, wherein performing the second training operation comprises performing one or more software instructions by a processing unit.

14. A system, comprising:
a first communication transceiver unit including a serializer circuit configured to convert parallel data into a serial data stream including multiple data words and transmit the serial data stream via a communication channel, wherein a particular data word includes a plurality of data bits and a header; and
a second communication transceiver unit, including a deserializer circuit configured to:
receive the receive the serial data stream via the communication channel;
determine a number of errors during reception of a given data word of the multiple data words;
in response to a detection of an end of the given data word:
initiate a first training operation to adjust a sampling point, in response to a determination that the number of errors is greater than a threshold number of errors; and
initiate a second training operation to adjust the sampling point, in response to a determination that a number of first training operations previously performed during a particular period of time is greater than a threshold number of previously performed first training operations; and
wherein the serializer circuit is further configured to configured to transmit a first number of training data bits during the first training operation and transmit a second number of training data bits during the second training operation, wherein the second number of training data bits is greater than the first number of training data bits.

15. The system of claim 14, wherein to determine the number of errors in the data, the deserializer circuit is further configured to perform a Cyclic Redundancy Check (CRC).

16. The system of claim 14, wherein to determine the number of errors during the reception of the plurality of data bits, the deserializer circuit is further configured to increment a first counter in response to detecting an error in the given data word in a given time period of a plurality of time periods.

17. The system of claim 16, wherein the deserializer circuit is further configured to reset the first counter in response to a determination that a given time period has expired, and wherein to perform the first training operation, the deserializer circuit is further configured to reset the first counter in response to a determination that the first training operation has completed.

18. The system of claim 16, wherein to determine that the number of first training operations performed during the particular period of time, the deserializer circuit is further configured to increment a second counter in response to a determination that the first training operation has completed.

19. The system of claim 18, wherein the deserializer circuit is further configured to reset the second counter in response to a determination that a given time period of a plurality of time periods has expired, and wherein to perform the second training operation, the deserializer circuit is further configured to reset the second counter in response to a determination that the second training operation has completed.

20. The system of claim 14, wherein performing the second training operation, the deserializer circuit is further configured to perform one or more software instructions by a processing unit.

* * * * *

UNITED STATES PATENT AND TRADEMARK OFFICE
CERTIFICATE OF CORRECTION

PATENT NO. : 9,921,899 B2  Page 1 of 1
APPLICATION NO. : 14/575590
DATED : March 20, 2018
INVENTOR(S) : Wong et al.

It is certified that error appears in the above-identified patent and that said Letters Patent is hereby corrected as shown below:

In the Drawings

On sheet 3 of 5, in FIG. 3, under (A), Line 6, delete "Begining" and insert -- Beginning --, therefor.

On sheet 3 of 5, in FIG. 3, under (B), Line 6, delete "Begining" and insert -- Beginning --, therefor.

In the Specification

In Column 5, Line 52, delete "a a" and insert -- a --, therefor.

In the Claims

In Column 11, Line 32, in Claim 1, delete "An," and insert -- An --, therefor.

In Column 12, Line 39, in Claim 7, delete "operations," and insert -- operations; --, therefor.

In Column 13, Line 17, in Claim 14, delete "receive the receive the" and insert -- receive the --, therefor.

In Column 13, Lines 33-34, in Claim 14, delete "configured to configured to" and insert -- configured to --, therefor.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*